United States Patent
Zachäus

(10) Patent No.: US 12,377,985 B2
(45) Date of Patent: Aug. 5, 2025

(54) PASSENGER SEAT ARRANGEMENT WITH A MODULAR ENERGY SUPPLY, AND PASSENGER AIRCRAFT HAVING SUCH A SEAT ARRANGEMENT

(71) Applicant: KID-Systeme GmbH, Buxtehude (DE)

(72) Inventor: Matthias Zachäus, Buxtehude (DE)

(73) Assignee: KID-Systeme GmbH, Buxtehude (DE)

( * ) Notice: Subject to any disclaimer, the term of this patent is extended or adjusted under 35 U.S.C. 154(b) by 171 days.

(21) Appl. No.: 17/875,906

(22) Filed: Jul. 28, 2022

(65) Prior Publication Data
US 2023/0057041 A1  Feb. 23, 2023

(30) Foreign Application Priority Data
Jul. 29, 2021  (EP) .................................... 21188519

(51) Int. Cl.
*B64D 11/06*  (2006.01)

(52) U.S. Cl.
CPC ...... *B64D 11/0696* (2013.01); *B64D 11/0624* (2014.12)

(58) Field of Classification Search
CPC .......... B64D 11/0624; B60N 3/00; A47C 7/72
USPC ...................................................... 297/217.3
See application file for complete search history.

(56) References Cited

U.S. PATENT DOCUMENTS

| | | | | |
|---|---|---|---|---|
| 6,619,588 | B2 * | 9/2003 | Lambiaso | B64D 11/0696 244/118.6 |
| 6,863,344 | B2 * | 3/2005 | Smallhorn | B64D 11/00153 297/217.3 |
| 7,063,562 | B2 * | 6/2006 | Henley | H02G 3/38 439/502 |
| 7,143,978 | B2 * | 12/2006 | Smallhorn | B64D 11/06 297/217.3 |
| 9,496,666 | B2 | 11/2016 | Abbinante | |
| 2002/0195523 | A1 | 12/2002 | Cawley | |
| 2004/0129445 | A1 * | 7/2004 | Winkelbach | B64C 1/18 174/76 |

(Continued)

FOREIGN PATENT DOCUMENTS

| | | |
|---|---|---|
| DE | 10 2018 119 130 A1 | 2/2020 |
| EP | 2 128 022 A1 | 12/2009 |
| EP | 3 363 737 A1 | 8/2018 |

OTHER PUBLICATIONS

European Search Report for Application for 21188519 dated Jan. 10, 2022.

(Continued)

*Primary Examiner* — Arfan Y. Sinaki
(74) *Attorney, Agent, or Firm* — KDW Firm PLLC

(57) ABSTRACT

A passenger seat arrangement for a passenger aircraft includes a passenger seat assembly having at least one passenger seat and a seat supporting frame, at least one seat fastening rail which can be installed in a cabin floor of the passenger aircraft and in which the seat supporting frame is mounted, a first electronic housing in which electrical power converter components are arranged and which is mounted on the seat fastening rail, a second electronic housing in which electrical output ports for connecting electronic terminal devices are arranged, and wired cabling which electrically connects a supply port of the electrical power converter components of the first electronic housing to the electrical output ports of the second electronic housing.

14 Claims, 3 Drawing Sheets

(56) References Cited

U.S. PATENT DOCUMENTS

| | | | |
|---|---|---|---|
| 2009/0298326 A1* | 12/2009 | Van Der Mee | B60N 2/06 439/501 |
| 2011/0079682 A1* | 4/2011 | Raybell | B64D 11/06 29/729 |
| 2013/0106177 A1* | 5/2013 | Imbert | B64D 11/0696 307/9.1 |
| 2015/0194776 A1 | 7/2015 | Abbinante | |
| 2016/0306417 A1 | 10/2016 | Greig et al. | |
| 2017/0021933 A1* | 1/2017 | Pozzi | B64D 11/0648 |
| 2017/0025803 A1* | 1/2017 | Abbinante | B64D 11/0015 |
| 2017/0155268 A1* | 6/2017 | Ayotte | H02J 7/0042 |
| 2018/0229847 A1 | 8/2018 | Smallhorn | |
| 2020/0130844 A1 | 4/2020 | Hahn et al. | |
| 2021/0229816 A1* | 7/2021 | Daubner | B64D 11/0696 |

OTHER PUBLICATIONS

Canadian Office Action for CA Application No. 3169326, dated Dec. 13, 2024, 7 pages.

* cited by examiner

PASSENGER SEAT ARRANGEMENT WITH A MODULAR ENERGY SUPPLY, AND PASSENGER AIRCRAFT HAVING SUCH A SEAT ARRANGEMENT

CROSS-REFERENCE TO RELATED APPLICATION

This application claims priority to EP Patent Application No. 21188519.9 filed Jul. 29, 2021, the entire disclosure of which is incorporated by reference herein.

TECHNICAL FIELD

The disclosure herein relates to a seat arrangement for passengers with an energy supply device of modular construction, to a passenger aircraft having such a seat arrangement, and to a method for supplying energy to a passenger seat arrangement in a passenger aircraft.

BACKGROUND

Personal electronic devices (PEDs) are ubiquitous nowadays. Normally, these PEDs are carried with the user wherever he travels, even on-board aircraft. For the comfort of the passengers, it is desirable to offer the passengers on board an aircraft the option to charge the electrical energy stores of the PEDs during their time on board the aircraft or to keep the PEDs in main operation. Airlines generally offer charging facilities for PEDs such as laptops, mobile telephones, smartphones, tablet PCs and the like, in which USB ports or mains ports are used for each passenger individually at their respective aircraft seat.

For the local supply of electrical consumers—both fixedly installed and also mobile devices such as PEDs—on board an aircraft, locally installed power distribution systems having power converters are used, to which a plurality of electrical consumers with different power requirements can be connected. The performance of such a power distribution system is mainly measured at the maximum and at the same time available power. The higher maximum power, the higher both weight and costs of the power distribution system. In particular in aviation, a balance between performance on the one hand and weight and costs on the other hand is therefore necessary.

For example, power distribution systems for groups of seats in passenger aircraft are able to supply electrical power to PEDs of all passengers of the group of seats equally, for example for mains operation and/or charging the energy stores of the PEDs.

Strict safety standards are imposed on passenger seats in passenger aircraft, with the result that, in the event of changes in the weight of an existing seat assembly which exceed a particular relative threshold value for example, recertification processes usually have to be run through in order to be able to retain the suitability for aviation (airworthiness).

In particular when retrofitting existing groups of passenger seats with an electrical energy supply and/or data connection lines, it is therefore desirable to avoid delays and/or costs which, under certain circumstances, would be associated with a new airworthiness test and certification of the seats.

The document US 2018/0229847 A1 discloses a system for supplying energy to passenger seats in passenger aircraft, in which a power converter module is accommodated in a side wall rail. The document U.S. Pat. No. 9,496,666 B2 discloses an electrical distribution unit mounted on a seat fastening rail of a passenger aircraft. The document DE 10 2018 119 130 A1 discloses an electronic housing mounted on a seat fastening rail of a passenger aircraft.

SUMMARY

One of the objects of the disclosure herein is to find solutions for supplying energy to electrical consumers and electrical ports of passenger seats in a passenger aircraft, which solutions make it easier to modify existing installations without making it necessary to recertify the entire seat assembly.

This and other objects are achieved by a passenger seat arrangement, a passenger aircraft and a method for supplying energy to a passenger seat arrangement in a passenger aircraft as disclosed herein.

According to a first aspect of the disclosure herein, a passenger seat arrangement for a passenger aircraft comprises a passenger seat assembly having at least one passenger seat and a seat supporting frame, at least one seat fastening rail which can be installed in a cabin floor of the passenger aircraft and in which the seat supporting frame is mounted, a first electronic housing in which electrical power converter components are arranged and which is mounted on the seat fastening rail, a second electronic housing in which electrical output ports for connecting electronic terminal devices are arranged, and wired cabling which electrically connects a supply port of the electrical power converter components of the first electronic housing to the electrical output ports of the second electronic housing.

According to a second aspect of the disclosure herein, a passenger aircraft comprises at least one passenger seat arrangement according to the first aspect of the disclosure herein and a passenger cabin and at least one electrical energy source. In this case, the seat fastening rail is mounted in the cabin floor of the passenger cabin. The second electronic housing is respectively connected to the at least one electrical energy source via electrical supply lines running in or along the seat fastening rail.

According to a third aspect of the disclosure herein, a method for supplying energy to a passenger seat arrangement in a passenger aircraft comprises the steps of mounting a passenger seat assembly having at least one passenger seat and a seat supporting frame on at least one seat fastening rail which is installed in a cabin floor of the passenger aircraft;
  mounting a first electronic housing, in which electrical power converter components are arranged, on the at least one seat fastening rail; mounting a second electronic housing, in which electrical output ports for connecting electronic terminal devices are arranged, on the passenger seat assembly; and
  electrically connecting a supply port of the electrical power converter components of the first electronic housing to the electrical output ports of the second electronic housing via wired cabling.

An important concept of the disclosure herein involves constructing an electrical energy supply device for passenger seats of a passenger aircraft in a modular manner such that the components of the supply device which are installed on the seat arrangement itself, for example sockets, line ports and their holders and possibly supplying cabling, comprise only lightweight parts. The heavier components, for instance voltage converters, fuses, electrical distributors, ventilation panelling and the like, are installed in a separate structure, that is to say in an encapsulated structure with its own housing on a seat fastening rail running in the floor of the passenger cabin. This makes it possible to equip existing seats and groups of seats with an electrical energy supply without necessarily requiring complicated recertification of the seat assembly.

Advantageous configurations and developments will emerge from the description with reference to the figures.

According to some embodiments of the passenger seat arrangement according to the disclosure herein, the first electronic housing has a rail mounting adapter, and the vector of the weight force of the first electronic housing runs through the rail mounting adapter into the seat fastening rail.

According to some further embodiments of the passenger seat arrangement according to the disclosure herein, the seat supporting frame has supporting feet for a seating surface of the at least one passenger seat. In some embodiments, these supporting feet may be used to fasten the first electronic housing to a supporting foot of the seat supporting frame.

According to some further embodiments of the passenger seat arrangement according to the disclosure herein, the electrical output ports of the second electronic housing may comprise USB sockets, seat lighting ports of passenger seats, AC voltage ports and/or seat actuator ports.

According to some embodiments of the passenger aircraft according to the disclosure herein, the weight of the second electronic housing may be less than 3% of the weight of the seat assembly.

According to some further embodiments of the passenger aircraft according to the disclosure herein, the seat fastening rails may run in the cabin floor along the longitudinal axis of the passenger aircraft.

According to some further embodiments of the passenger aircraft according to the disclosure herein, the passenger seat arrangement may have at least two passenger seats arranged beside one another. In this case, in some embodiments, a seat fastening rail in the cabin floor may be assigned to each of the at least two passenger seats arranged beside one another. In some embodiments, the passenger seat arrangement may have at least two separate first electronic housings in each of which electronic power converter components are arranged and which are mounted on different ones of the seat fastening rails assigned to the at least two passenger seats arranged beside one another.

According to some further embodiments of the passenger aircraft according to the disclosure herein, the at least one first electronic housing may have openings for passive air cooling of the electrical power converter components arranged therein.

According to some embodiments of the method according to the disclosure herein, the weight of the second electronic housing may be less than 3% of the weight of the passenger seat assembly.

According to some embodiments of the method according to the disclosure herein, the seat supporting frame may have supporting feet for a seating surface of the at least one passenger seat. In this case, the mounting of the first electronic housing may also comprise fastening the first electronic housing to a supporting foot of the seat supporting frame.

According to some embodiments of the method according to the disclosure herein, the first electronic housing may have a rail mounting adapter, and the vector of the weight force of the first electronic housing may run through the rail mounting adapter into the seat fastening rail.

The above configurations and developments may be combined with one another as desired where expedient. Further possible configurations, developments and implementations of the disclosure herein also encompass combinations, which are not explicitly mentioned, of features of the disclosure herein described above or below with regard to the example embodiments. A person skilled in the art here will in particular also add individual aspects as improvements or additions to the respective basic form of the disclosure herein.

BRIEF DESCRIPTION OF THE DRAWINGS

The disclosure herein will be discussed in more detail below on the basis of the example embodiments shown in the schematic figures. In the figures.

Figure 1:
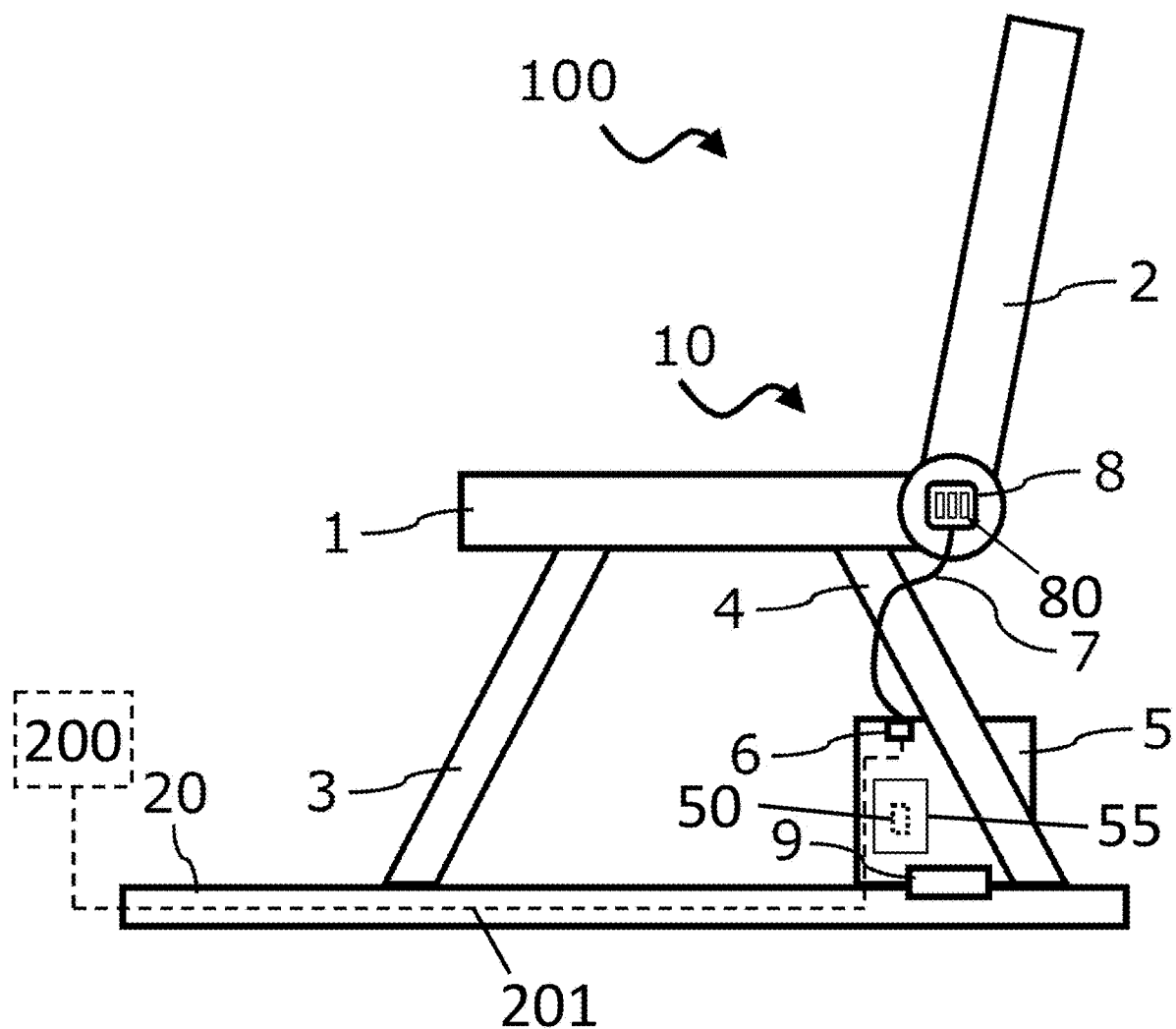
FIG. 1 shows a side view of a schematic illustration of a passenger seat arrangement for a passenger aircraft according to one embodiment of the disclosure herein.

The appended figures are intended to provide improved understanding of the embodiments of the disclosure herein. They illustrate embodiments and serve, in conjunction with the description, for the explanation of principles and concepts of the disclosure herein. Other embodiments, and many of the stated advantages, will emerge with regard to the drawings. The elements of the drawings are not necessarily shown true to scale relative to one another. Direction-indicating terminology such as, for instance, "top", "bottom" "left", "right", "above" "below", "horizontal", "vertical", "front", "rear" and similar indications are used only for explanatory purposes and do not serve to restrict the generality to specific configurations as shown in the figures.

In the figures of the drawing, elements, features and components that are identical, functionally identical and of identical action are denoted in each case by the same reference signs unless stated otherwise.

DETAILED DESCRIPTION

Personal electronic devices (PEDs) in the context of this disclosure herein comprise all electronic devices that may be used for entertainment, communication and/or for office use. For example, PEDs can comprise all types of terminal devices, such as laptops, mobile telephones, smartphones, handheld devices, palmtops, tablet PCs, GPS devices, navigation devices, audio devices such as MP3 players, portable DVD or Blu-ray® players or digital cameras.

Passenger seats in the context of this disclosure herein may comprise any form of structural component parts of a vehicle that are intended to seat a passenger for the duration of the journey using the vehicle. In particular, passenger seats in aircraft may be used personally and at least temporarily exclusively by the aircraft passenger of the aircraft during the flight. Seats or passenger seats in the context of the disclosure herein may be aircraft seats divided into seat assemblies, but also loungers, armchairs, beds, suites of first class or business class or similar seating furniture within an aircraft.

Power converter components in the context of the disclosure herein are all circuits and devices that may be used to convert an in-fed type of electric current-direct current or alternating current-to the other respectively or to change characteristic parameters such as the voltage and frequency of an in-fed type of electric current. Power converter components may comprise power converters, for example. Such power converters may comprise rectifiers for converting alternating current to direct current, inverters for converting direct current to alternating current, converters for converting one type of alternating current to another or DC voltage converters for converting one type of direct current to another. Power converter components in the context of the disclosure herein may be implemented with the aid of analogue components such as resistors, inductances and capacitors and/or electronic components based on semiconductors, for example diodes, transistors or thyristors.

Figure 2:
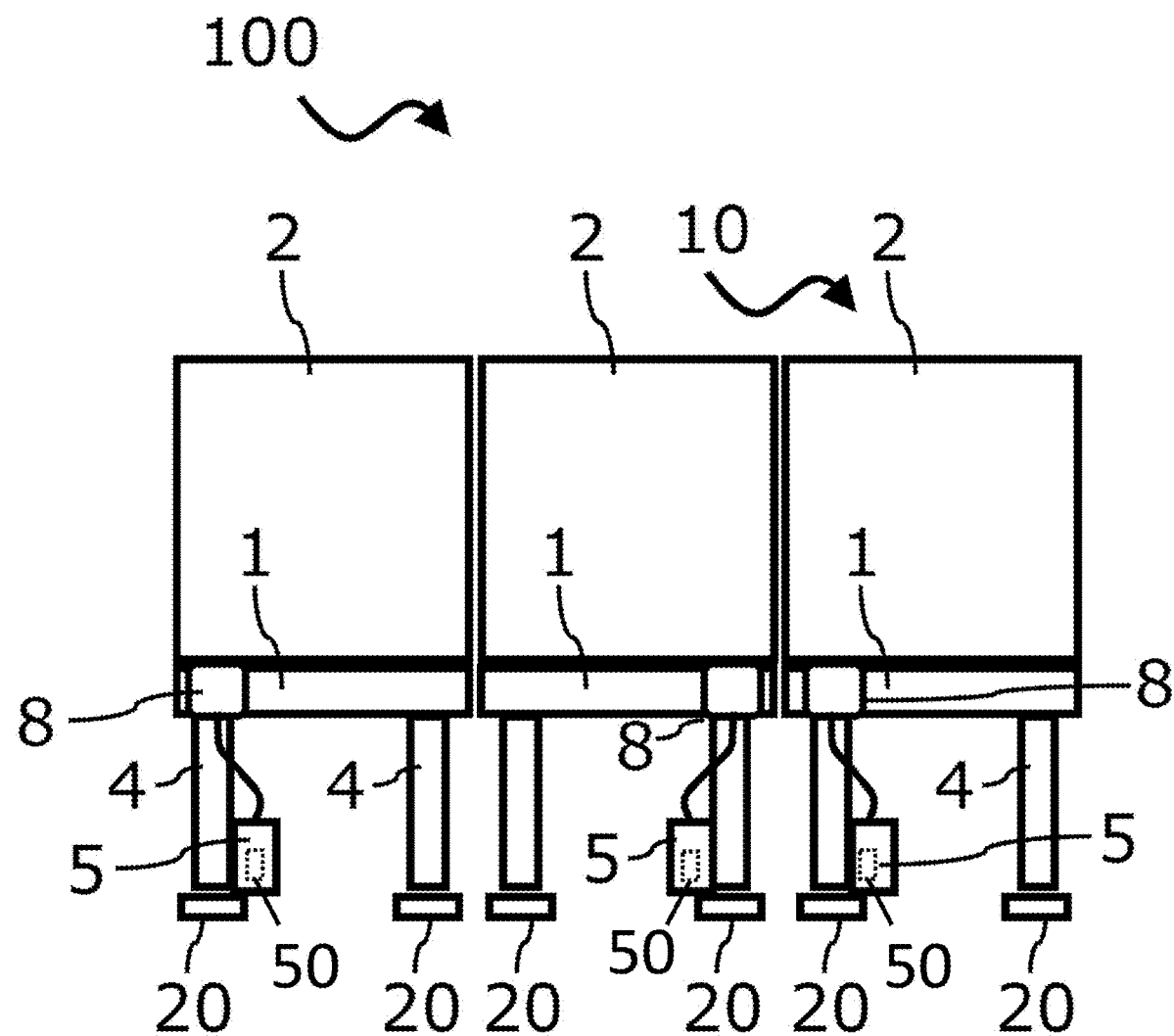
FIG. 2 shows a rear view of a schematic illustration of a passenger seat arrangement for a passenger aircraft according to one embodiment of the disclosure herein.
Figure 3:
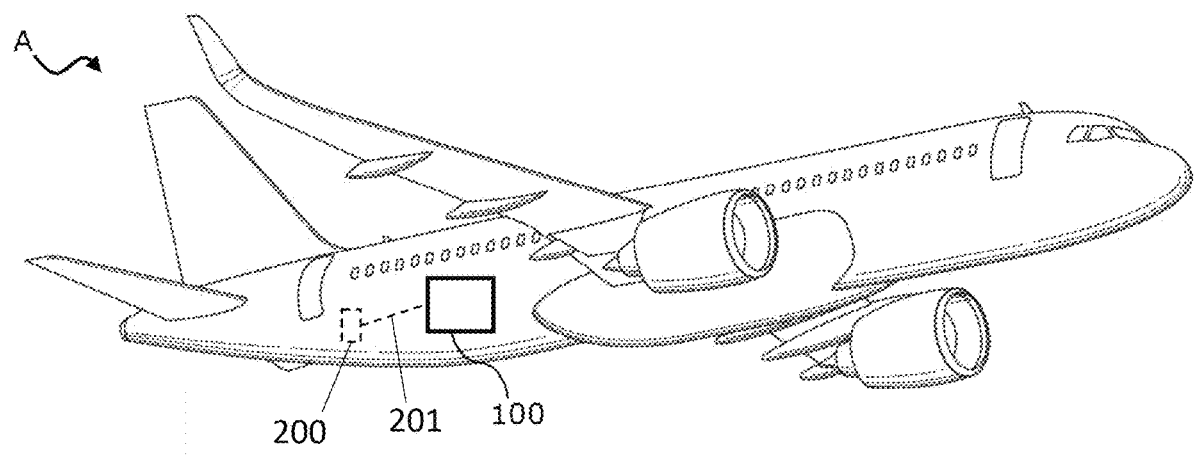
FIG. 3 shows a schematic illustration of an aircraft having a passenger seat arrangement according to FIG. 1 or 2 according to a further embodiment of the disclosure herein.

FIG. 1 shows a side view of a passenger seat arrangement 100 in a schematic structure. FIG. 2 shows a corresponding rear view of the passenger seat arrangement 100. The passenger seat arrangement 100 may have, for example, a seat assembly 10 in a passenger aircraft, for instance the aircraft A illustrated schematically in FIG. 3. In this case, a passenger aircraft A may comprise various seat assemblies which are fixedly or firmly mounted in a passenger cabin via one or more seat fastening rails 20 running in the passenger cabin floor.

The seat assembly 10 may have one or more passenger seats which have, for example, a seating surface 1 and a backrest 2 articulated to the seating surface 1. In this case, the passenger seats may be arranged, for example, beside one another, that is to say with laterally adjoining seating surfaces, with the result that a plurality of passengers may each occupy one passenger seat in the seat assembly 10 at the same time.

Furthermore, the seat assembly 10 may have a seat supporting frame having front supporting feet 3 and rear supporting feet 4 which support and bear the seating surface 1. The seat assembly 10 can be mounted on one or more seat fastening rails 20 in the passenger cabin via the seat supporting frame. In this case, the seat fastening rails 20 may have, for example, a direction in the cabin floor along the longitudinal axis of the passenger aircraft A and, in particular, may run parallel to one another in the case of a plurality of seat fastening rails 20.

Electrical supply lines 201 which can be used to electrically connect the electrical energy sources 200 on board the passenger aircraft A to energy supply systems assigned to respective seat assemblies 10 and to supply them with electrical energy may run in or along the seat fastening rails 20.

In this case, each passenger seat arrangement 100 in a passenger aircraft A may have, for example, a separate energy supply system locally mounted in the passenger aircraft A. In this case, the energy supply systems have a modular construction: A basic module of the respective energy supply system can be mounted on one of the seat fastening rails 20, while an associated peripheral module of the energy supply system is mounted on the seat assembly 10 at a suitable position that is suitable for connecting electrical consumers. The energy supply systems may be supplied by one or more electrical energy sources 200 in the passenger aircraft A.

The electrical energy sources 200 may have, for example, one or more AC voltage sources, for example generators-in particular engine generators or generators of ram air turbines. Alternatively or additionally, the electrical energy sources 200 may comprise, for example, DC voltage sources, for instance photovoltaic installations or fuel cells.

The electrical energy sources 200 may be electrically coupled to the respective basic modules of the energy supply systems via electrical supply lines 201 which run in or along the seat fastening rails 20.

The energy supply systems may be designed, for example, to supply permanently installed electrical consumers, for instance displays of an on-board entertainment system on board a passenger aircraft, seat lighting systems of passenger seats, seat actuators or the like, as well as temporarily connected electrical consumers, for example PEDs, power banks or similar consumers, which are each assigned to a seat of the passenger seat arrangement 100 and are provided for use by a passenger booked on the respective seat for the duration of a journey.

As illustrated in FIGS. 1 and 2, the electrical energy supply system has a modular construction such that the basic module has a first electronic housing 5 in which electrical power converter components 50 are arranged. The first electronic housing 5 comprises a rail mounting adapter 9, with the aid of which the first electronic housing 5 is installed on one or more of the seat fastening rails 20 or at one or more of the seat fastening rails 20. The horizontal course of the seat fastening rails 20 means that the first electronic housing 5 is upright on the cabin floor and the vector of the weight force of the first electronic housing 5 runs through the rail mounting adapter 9 into the seat fastening rail 20 during normal operation of the passenger aircraft A. This increases the mechanical stability of the mounting position of the first electronic housing 5 on the seat fastening rail 20, with the result that particularly powerful and therefore rather heavy power converter components can also be arranged inside the first electronic housing 5.

In order to further improve the mechanical stability of the first electronic housing 5, the first electronic housing 5 can be mounted on or at the seat fastening rail 20 at a position which is in the vicinity of one of the supporting feet 4 of the seat supporting frame of the seat assembly 10. In this case, the first electronic housing 5 can be fastened to the supporting foot of the seat supporting frame via suitable mechanical connectors, for instance screws, bolts or rivets. In particular in the case of heavy power converter components which are installed in the first electronic housing 5, the basic module of the electrical energy supply system can be secured in an even better way in this manner.

A peripheral module of the electrical energy supply system is accommodated in a second electronic housing 8 which is separated from the first electronic housing 5. The first electronic housing 5 may have a supply port 6 which can be used to electrically connect one or more second electronic housings 8 via electrical supply lines 7 in the form of wired cabling. As a result of the separation between the first and second electronic housings 5 and 8 in the basic module and the peripheral module, respectively, the second electronic housings 8 can be placed on the seat assembly 10 according to ergonomic aspects. In addition, rather lightweight components of the electrical energy supply system may be accommodated in the second electronic housing 8, with the result that the weight of the second electronic housing 8, together with the components accommodated therein, is less than 3% of the weight of the seat assembly 10. This advantageously makes it possible to avoid the requirement for recertification of the seat assembly 10 on account of an excessive change in the overall weight, whether through retrofitting an electrical energy supply system or other future electrical components.

The second electronic housing 8 has electrical output ports 80 for connecting electronic terminal devices, for example PEDs of passengers. The electrical output ports 80 may comprise, for example, USB sockets, seat lighting ports of passenger seats, AC voltage ports and/or seat actuator ports. The supply port 6 of the electrical power converter components 50 of the first electronic housing 5 is electrically connected to the electrical output ports 80 of the second electronic housing 8 via the wired cabling 7.

The electrical output interfaces in the second electronic housing 8 may be, in particular, USB interfaces which operate according to the USB power delivery and/or the USB battery charging specification. Electrical consumers that are connected to the USB interfaces, for example PEDs of passengers of a passenger aircraft A, may accordingly obtain electrical power from the energy supply system.

The first electronic housing 5 may have openings 55 for passive air cooling of the electrical power converter therein. Alternatively or components 50 arranged additionally, it may also be possible to actively cool the electrical power converter components 50 inside the first electronic housing 5 by a suitable cooling system.

Figure 4:
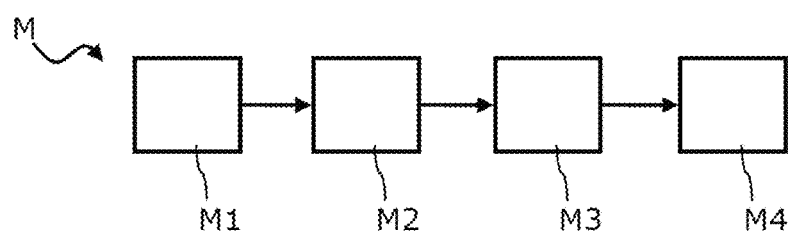
FIG. 4 shows a schematic flowchart of the steps of a method for supplying energy to a passenger seat arrangement for a passenger aircraft according to a further embodiment of the disclosure herein.

FIG. 4 shows a flowchart of method steps of a method M for supplying energy to a passenger seat arrangement in a passenger aircraft, for example the passenger seat arrangement 100 explained and shown in connection with FIGS. 1 and 2. The method M may be carried out, in particular, in a passenger aircraft A having passenger seat arrangements 100 as explained in connection with FIG. 3.

In a first step M1, a passenger seat assembly 10 having at least one passenger seat and a seat supporting frame is first of all mounted on at least one seat fastening rail 20 which is installed in a cabin floor of the passenger aircraft A. In a second step M2, a first electronic housing 5, in which electrical power converter components are arranged, is then mounted on the at least one seat fastening rail 20. The first electronic housing 5 may have, for example, a rail mounting adapter 9, and a vector of the weight force of the first electronic housing 5 may run through the rail mounting adapter 9 into the seat fastening rail 20.

This first electronic housing 5 is used as a basic module of an electrical energy supply system for the passenger seat assembly 10. The seat supporting frame may have, for example, supporting feet for a seating surface 1 of the at least one passenger seat, with the result that the first electronic housing 5 may be fastened to a supporting foot 4 of the seat supporting frame during mounting in step M2.

In a third step M3, a second electronic housing 8, in which electrical output ports 80 for connecting electronic terminal devices are arranged, is mounted on the passenger seat assembly 10. This second electronic housing 8 is separate from the first electronic housing 5 and is used as a peripheral module of the electrical energy supply system for the passenger seat assembly 10. The weight of the second electronic housing 8 and of the electrical and electronic components accommodated therein may here be less than 3% of the weight of the passenger seat assembly 10, thus advantageously making it possible to avoid the requirement for recertification of the passenger seat assembly 10 on account of an excessive change in the overall weight as a result of retrofitting an electrical energy supply system.

Finally, in a fourth step M4, a supply port 6 of the electrical power converter components 50 of the first electronic housing 5 is electrically connected to the electrical output ports 80 of the second electronic housing 8 via wired cabling 7.

In order to improve the stringency of the representation, various features were combined in one or more examples in the detailed description above. However, it should be clear in this case that the description above is only of an illustrative and in no way restrictive nature. It is used to cover all alternatives, modifications and equivalents of the various features and example embodiments. Many other examples will be immediately and directly clear to a person skilled in the art on the basis of his technical knowledge in view of the description above.

The example embodiments were chosen and described in order to be able to represent the principles on which the disclosure herein is based and their possible uses in practice in the best possible manner. As a result, experts may optimally modify and use the disclosure herein and its various example embodiments for the intended purpose. In the claims and the description, the terms "containing" and "having" are used as neutral concepts for the corresponding term "comprising". Furthermore, use of the terms "a", "an" and "one" is not intended to fundamentally exclude a plurality of features and components described in such a way.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat arrangement for a passenger aircraft, the passenger seat arrangement comprising:
    a passenger seat assembly having at least one passenger seat and a seat supporting frame;
    at least one seat fastening rail which can be installed in a cabin floor of the passenger aircraft and in which the seat supporting frame is mounted;
    a first electronic housing comprising electrical power converter components, wherein the first electronic housing is mounted on the seat fastening rail by a rail mounting adapter that directly attaches the first electronic housing to the seat fastening rail, such that a vector of a weight force of the first electronic housing runs through the rail mounting adapter into the seat fastening rail;
    a second electronic housing in which electrical output ports for connecting electronic terminal devices are disposed; and
    wired cabling which electrically connects a supply port of the electrical power converter components of the first electronic housing to the electrical output ports of the second electronic housing;
    wherein the seat supporting frame has front supporting feet and rear supporting feet for a seating surface of the at least one passenger seat; and
    wherein the first electronic housing is fastened to a rear supporting foot of the rear supporting feet of the seat supporting frame.

2. The passenger seat arrangement according to claim 1, wherein the second electronic housing is directly attached to or formed in the at least one passenger seat of the passenger seat assembly.

3. The passenger seat arrangement according to claim 1, wherein the electrical output ports of the second electronic housing comprise USB sockets, seat lighting ports of passenger seats, AC voltage ports and/or seat actuator ports.

4. A passenger aircraft comprising:
a passenger cabin;
at least one electrical energy source; and
at least one passenger seat arrangement according to claim 1, the at least one seat fastening rail of which is mounted in the cabin floor of the passenger cabin, and the second electronic housing of which is respectively connected to the at least one electrical energy source via electrical supply lines running in or along the seat fastening rail.

5. The passenger aircraft according to claim 4, wherein a weight of the second electronic housing is less than 3% of a weight of the passenger seat assembly.

6. The passenger aircraft according to claim 4, wherein the seat fastening rail runs in the cabin floor along a longitudinal axis of the passenger aircraft.

7. The passenger aircraft according to claim 4, wherein the passenger seat arrangement has at least two passenger seats arranged beside one another.

8. The passenger aircraft according to claim 7, wherein:
a seat fastening rail in the cabin floor is assigned to each of the at least two passenger seats arranged beside one another;
the passenger seat arrangement has at least two separate first electronic housings, in each of which electronic power converter components are arranged; and
the at least two separate first electronic housings are mounted on different ones of the seat fastening rails assigned to the at least two passenger seats arranged beside one another.

9. The passenger aircraft according to claim 4, wherein the at least one first electronic housing has openings for passive air cooling of the electrical power converter components therein.

10. A method for supplying energy to a passenger seat arrangement in a passenger aircraft, the method comprising:
mounting a passenger seat assembly having at least one passenger seat and a seat supporting frame on at least one seat fastening rail which is installed in a cabin floor of the passenger aircraft;
mounting a first electronic housing, in which electrical power converter components are arranged, on the at least one seat fastening rail by a rail mounting adapter that directly attaches the first electronic housing to the seat fastening rail, such that a vector of a weight force of the first electronic housing runs through the rail mounting adapter into the seat fastening rail;
mounting a second electronic housing, which comprises electrical output ports for connecting electronic terminal devices, on the passenger seat assembly; and
electrically connecting a supply port of the electrical power converter components of the first electronic housing to the electrical output ports of the second electronic housing via wired cabling;
wherein the seat supporting frame has front supporting feet and rear supporting feet for a seating surface of the at least one passenger seat; and
wherein the first electronic housing is fastened to a rear supporting foot of the rear supporting feet of the seat supporting frame.

11. The method according to claim 10, wherein a weight of the second electronic housing is less than 3% of a weight of the passenger seat assembly.

12. The method according to claim 10, wherein the second electronic housing is directly attached to or formed in the at least one passenger seat of the passenger seat assembly.

13. A passenger seat arrangement for a passenger aircraft, the passenger seat arrangement comprising:
a passenger seat assembly having at least one passenger seat and a seat supporting frame;
at least one seat fastening rail which can be installed in a cabin floor of the passenger aircraft and in which the seat supporting frame is mounted;
a first electronic housing comprising electrical power converter components, wherein the first electronic housing is mounted on the seat fastening rail by a rail mounting adapter that directly attaches the first electronic housing to the seat fastening rail, such that a vector of a weight force of the first electronic housing runs through the rail mounting adapter into the seat fastening rail;
a second electronic housing in which electrical output ports for connecting electronic terminal devices are disposed; and
wired cabling which electrically connects a supply port of the electrical power converter components of the first electronic housing to the electrical output ports of the second electronic housing;
wherein the second electronic housing is directly attached to or formed in the at least one passenger seat of the passenger seat assembly;
wherein the seat supporting frame has front supporting feet and rear supporting feet for a seating surface of the at least one passenger seat;
wherein the front supporting feet are inclined towards the rear supporting feet;
wherein the first electronic housing is fastened to a rear supporting foot of the rear supporting feet of the seat supporting frame; and
wherein the electrical output ports of the second electronic housing comprise USB sockets, seat lighting ports of passenger seats, AC voltage ports and/or seat actuator ports.

14. The passenger seat arrangement of claim 13, wherein a weight of the second electronic housing is less than 3% of a weight of the passenger seat assembly.

* * * * *

UNITED STATES PATENT AND TRADEMARK OFFICE
CERTIFICATE OF CORRECTION

| | | |
|---|---|---|
| PATENT NO. | : 12,377,985 B2 | Page 1 of 1 |
| APPLICATION NO. | : 17/875906 | |
| DATED | : August 5, 2025 | |
| INVENTOR(S) | : Matthias Zachäus | |

It is certified that error appears in the above-identified patent and that said Letters Patent is hereby corrected as shown below:

In the Specification

Column 7 Line 17: "The first electronic housing 5 may have openings 55 for passive air cooling of the electrical power converter therein. Alternatively or components 50 arranged additionally," should be -- The first electronic housing 5 may have openings 55 for passive air cooling of the electrical power converter components 50 arranged therein. Alternatively or additionally, --.

Signed and Sealed this
Eleventh Day of November, 2025

John A. Squires
*Director of the United States Patent and Trademark Office*